Oct. 15, 1935.    M. FRÄNKL    2,017,240

PROCESS AND APPARATUS FOR THE RESOLUTION OF GASEOUS MIXTURES

Filed May 2, 1934

INVENTOR
MATHIAS FRÄNKL
BY
Watson, Bristol, Johnson & Leavenworth
ATTORNEYS

Patented Oct. 15, 1935

2,017,240

UNITED STATES PATENT OFFICE 2,017,240

PROCESS AND APPARATUS FOR THE RESOLUTION OF GASEOUS MIXTURES

Mathias Fränkl, Augsburg, Germany, assignor to American Oxythermic Corporation, New York, N. Y., a corporation of Delaware Application May 2, 1934, Serial No. 723,480
In Germany May 9, 1933

15 Claims. (Cl. 62—175.5)

The invention relates to a process and an apparatus for the resolution of gaseous mixtures. More particularly, it relates to an effective manner in which a gas mixture may be partially condensed and liquid thus obtained evaporated, and especially to a process and an apparatus for the separation of air into nitrogen and oxygen, and includes correlated improvements and discoveries whereby the separation of gaseous mixtures into components may be enhanced.

In the resolution of low boiling gaseous mixtures, a rectification may be directly combined with the liquefaction of the gaseous mixture and also with the vaporization or revaporization of the liquid produced which is enriched in a higher boiling component, inasmuch as the method is simpler and more economical than when effecting the rectification apart from the liquefaction and evaporation.

This combined liquefaction and rectification process which is followed by a combined evaporation and rectification process may be carried out in a co-current evaporator, on the condenser side of which the gaseous mixture to be separated is liquefied by means of the known fractional condensation, whereby said gaseous mixture is also separated into higher and lower boiling components.

The separation of a gaseous mixture into its components through rectification may be enhanced by a more intimate contact between liquid and vapors than is present in condenser-vaporizer operation when no supplementary steps are taken. Furthermore, the liquid on the vaporizer side as well as on the condenser side flows down the steep condenser-vaporizer walls too rapidly to permit it to contact for a sufficient period with the vapors unless a method of operation is utilized for bringing about an intensive contact.

An object of the invention is to provide a process whereby a gaseous mixture may be separated into a gaseous and a liquid component by fractional condensation with accompanying rectification, and the liquid component so obtained evaporated with accompanying rectification.

A further object of the invention is to provide a process in which condensation of a part of a gaseous mixture is effected with accompanying rectification and diversion of liquid from the condensing surfaces to a rectification inset, and the liquid so produced evaporated with alternate diversion from the vaporizing surface to a rectification inset and returned to said surface.

An additional object of the invention is to provide a process in which the surface contact between liquid and gaseous components is markedly increased.

Another object of the invention is to provide an apparatus comprising a condenser-vaporizer in which the surface upon which rectification may take place in the condensation and vaporizing spaces is materially increased.

A still further object of the invention is to provide an apparatus in which the condensation and vaporizing spaces of a condenser-vaporizer are provided with rectification in sets thereby increasing the surface contact between liquid and gas or vapor.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

The present invention provides a process for carrying out a condensation and evaporation operation in plants for the resolution of gas mixtures with the aid of a co-current evaporator in which the liquid on the vaporizer side is continuously conducted on its way from the top to the bottom, away from the vaporizer walls or surfaces to a rectification inset and is subsequently returned thereto by the shortest way, so that on the one hand these walls are maintained in a moistened condition, and on the other hand an intensive contact between liquid and vapors is accomplished.

Likewise in the present process the liquid condensed from the gaseous mixture on the condenser side surfaces is diverted as fully as possible to a rectification inset, and maintained out of contact with the condenser surfaces, because the liquid adhering to these surfaces affects the liquefaction capacity on the one hand and the contact with the vapors on the other hand. To the contrary, the evaporation capacity on the vaporizer side depends upon an extensive and continual moistening of the evaporation surfaces.

In the practice of the invention a gaseous mixture may be resolved into components by liquefying the mixture with accompanying fractionation and rectification having countercurrent liquid and gas flow. The gaseous mixture is thus separated into a lower boiling gaseous component and a higher boiling liquid component. The liquid so produced is vaporized by trickling in a continuously downward direction and countercurrently in indirect heat exchange relation with the gaseous mixture. The liquefaction stage is carried out in such a manner that the liquid formed is conducted and maintained away from the heat exchange surface, whereas on the other hand the trickling liquid is alternately conducted away from with accompanying rectification and then back to the heat exchange surface. Further, the liquid undergoing vaporization may be characterized by a cocurrent flow in thin streams with continuity of direct contact of vapor and liquid. Furthermore, the liquefaction and vaporization are conducted preferably at different pressures with the liquefaction being effected at the higher pressure, and when air is being resolved the liquefaction may take place at one atmosphere absolute and the vaporization at a reduced pressure, as 0.5 atmospheres absolute.

For a fuller understanding of the nature and objects of the invention reference should be had to the following detailed description taken in connection with the accompanying drawing, in which.

Figure 1:
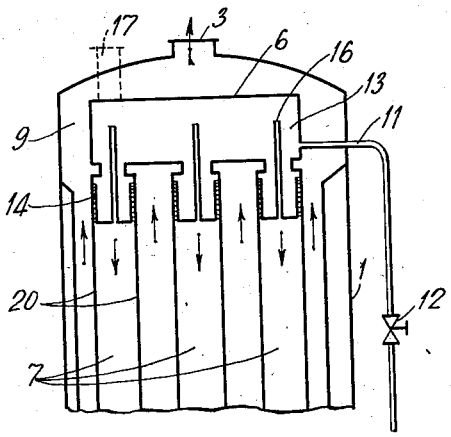
Fig. 1 illustrates diagrammatically a construction of a condenser-vaporizer which may be provided with rectification insets and is suitable for carrying out the process herein described.
Figure 1:
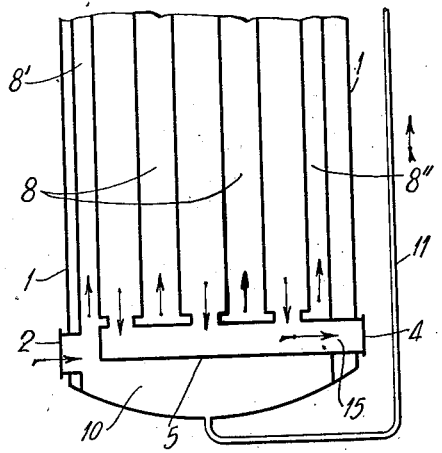
Figure 4:
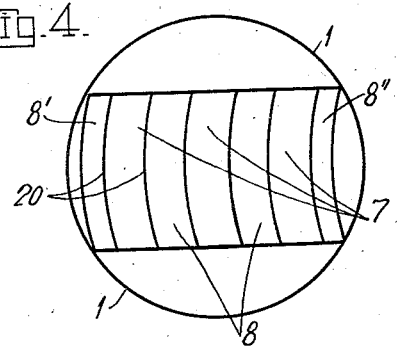
Fig. 4 is a horizontal cross section of the condenser-vaporizer shown in Fig. 1, and being modified in construction by the arcuate form of the vaporizing chambers.
Figure 2:
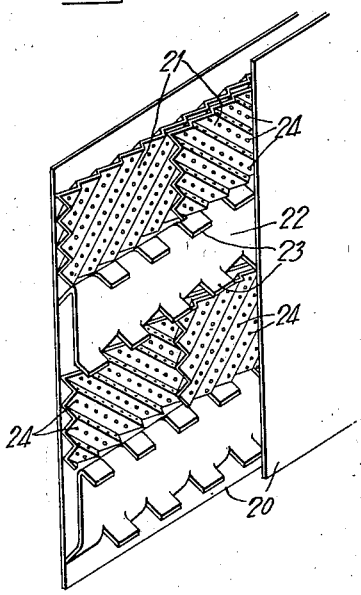
Fig. 2 shows a rectification inset arrangement on an enlarged scale which is suitable for use in the vaporizing spaces or chambers of the condenser-vaporizer.
Figure 3:
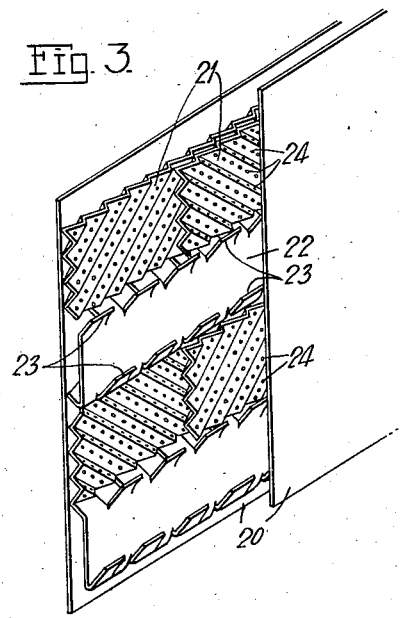
Fig. 3 shows a similar arrangement of rectification insets for use in the condenser spaces.

The apparatus as shown in Fig. 1 comprises in combination a plurality of vaporizer elements made of two closely connected plates 20 of sheet metal, of which a suitable number are joined together in such a way that the intermediate condensation spaces 8 are formed between the vaporizing chambers 7. The entire apparatus is then enclosed in a casing 1, having an inlet 2 for cooled and preferably compressed gaseous mixture to be resolved. In the upper part 9 the uncondensed residual portion of lower boiling component, separated by fractional liquefaction combined with simultaneous rectification, is collected and withdrawn at 3. The condensed liquid, containing higher boiling component, collects in the lower part 10 of the casing 1. Thence the liquid is conveyed by means of the pipe 11 provided with a valve 12 to the upper header 6 leading to the vaporizing chambers.

A plurality of diagonally corrugated, metal strips 21 having fine perforations 24 are inserted in pairs in the vaporizing spaces 7 as well as in the condensation spaces or chambers 8 in such a way that the diagonal corrugations of two strips forming a pair and lying one upon the other extend in opposite directions. Further, the pairs of strips are inserted one below the other in such a manner that the diagonal corrugations of one pair will run in the opposite direction to those of the next preceding and succeeding pair in order that the liquid will not flow simply to one side. The vapors pass between the corrugations of the strips from the top to the bottom (cocurrent operation) or from the bottom to the top (countercurrent operation). A plain strip 22 is positioned between each two pairs of strips and is provided with outwardly bent lugs 23 by which the liquid is either continuously returned to the vaporizing surfaces or is kept away from the condensation surfaces.

The insertion of the pairs of corrugated strips and also of the plain strips having lugs occasions a diversion of the vapors from their main vertical direction of flow to the direction of the corrugations. Thereby they are intensely whirled and come into intimate contact with the liquid with which the strips are continuously moistened.

Inasmuch as the corrugated and perforated strips lie close to both vaporizer walls, they cause the liquid to flow temporarily away from the walls to the strips from whence it is returned to the walls by means of the next succeeding strip provided with the lugs. It is then again diverted by the next pair of corrugated strips, and thus the liquid flows back and forth, until finally near the lower end it is completely evaporated. On the condenser side the plain strips provided with lugs are inserted in the reverse manner in order that the liquid will be conducted and maintained away from the condenser walls.

The vapor is either withdrawn at the bottom through passage 15 and outlet 4, or at the top at outlet 17. The liquid is removed from condenser chamber 10 through pipe 11 having an expansion valve 12 and is introduced into space 13 of the header 6 forming the top of the evaporator elements, or vaporizing chambers.

In order that the liquid will be uniformly distributed to all the chambers and to the walls thereof, a dam comprising a strip of metal gauze 14 is fitted closely between the two sheet metal plates 20 at the upper end of each chamber. The flow resistance of this gauze is such that the liquid dams up to approximately 30–100 mm. before it flows through the meshes of the gauze in suitable quantities.

The tubes 16 provided at the upper end of the vaporizing spaces 7 serve to conduct the vapors from the liquid chamber 13 into the vaporizing spaces 7, inasmuch as a small portion of liquid evaporates when the liquid is led into the upper header and with cocurrent rectification operation these vapors assist the action in the vaporizing spaces 7 i. e., with vapor withdrawal at the lower end of same. With countercurrent evaporator operation, wherein the vapors are withdrawn at the top of the upper header, these tubes serve for the withdrawal of all the vapors, which in this instance are withdrawn at 17, as shown in the drawing by dotted lines.

The width of the outer condenser spaces 8′ and 8″ is about half that of the intermediate condenser spaces 8, because condensation takes place only on one side, viz., on the outer sides of the apparatus, inasmuch as no vaporization occurs on the other or outer shell side, and for this reason only half of the volume of gas passes through these spaces as passes through the condenser spaces 8.

Another function of the corrugated strips is that they simultaneously support the two evaporator walls against the external excess pressure on the condenser side. This will be apparent from the following consideration. The surface dimensions of the condenser-evaporator elements which are constructed of two thin sheet metal plates, are up to 1 m. breadth and up to 3 m. height. Inasmuch as it is difficult to adjust sheet metal plates of such size absolutely even, and as on the other hand the element walls fit snugly against the insets at all points, it is desirable to construct the elements in the form of an arc.

The surface area of the rectification insets on the vaporizer and condenser sides amounts to many times that of the vaporizer and condenser surfaces. It is in such manner that it is possible to effect a contact sufficiently intensive between the liquid and the vapors so that the rectification takes place to the desired extent. Furthermore, one of the principal conditions of this procedure is a sufficient moistening of the rectification insets, said moistening being continuously renewed by the descending liquid.

The foregoing procedure provides a process according to which liquid on the vaporized side is alternately diverted from the vaporizing surface to a rectification inset in order to moisten the latter and is then returned by the shortest way to such surface so that despite this diversion a complete moistening of the surfaces is maintained, while liquid on the condenser side, after being diverted from the condenser surfaces to the rectification inset, is not returned, but rather is conducted downward to the outlet by means of the insets. On the vaporized side the vapors may be conducted either cocurrently or countercurrently with the evaporating liquid; on the condenser side the vapors always flow countercurrently to the descending liquid.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the resolution of a gaseous mixture which comprises liquefying said mixture with accompanying fractionation and rectification having countercurrent liquid and gas flow, vaporizing liquid so produced by trickling in continuous films in a continuously downward direction and countercurrently in indirect heat exchange relation with the gaseous mixture, conducting and maintaining the liquid formed by liquefaction away from the heat exchange surface during the liquefaction, and alternately conducting the trickling liquid away from with accompanying rectification and then back to the heat exchange surface.

2. A process for the resolution of a gaseous mixture which comprises liquefying said mixture with accompanying fractionation and rectification having countercurrent liquid and gas flow, vaporizing liquid so produced under reduced pressure by trickling in continuous films in a continuously downward direction and countercurrently in indirect heat exchange relation with the gaseous mixture, conducting and maintaining the liquid formed by liquefaction away from the heat exchange surface during the liquefaction, and alternately conducting the trickling liquid away from with accompanying rectification and then back to the heat exchange surface.

3. A process for the resolution of a gaseous mixture which comprises liquefying said mixture with accompanying fractionation and rectification having countercurrent liquid and gas flow, vaporizing liquid so produced by trickling in continuous films in a continuously downward direction and countercurrently in indirect heat exchange relation with the gaseous mixture, conducting and maintaining the liquid formed by liquefaction away from the heat exchange surface during the liquefaction, and alternately conducting the trickling liquid away from with accompanying rectification and then back to the heat exchange surface and with cocurrent flow in thin streams with continuity of direct contact of vapor and liquid.

4. A process for the resolution of air into oxygen and nitrogen which comprises liquefying air with accompanying fractionation and rectification having countercurrent flow of air and liquid whereby there is produced a liquid enriched in oxygen, vaporizing said liquid by trickling in continuous films in a continuously downward direction and countercurrently in indirect heat exchange relation with the air, conducting and maintaining the liquid enriched in oxygen away from the heat exchange surface during liquefaction, and alternately conducting the trickling liquid away from with accompanying rectification and then back to the heat exchange surface to effect vaporization thereof.

5. A process for the resolution of air into oxygen and nitrogen which comprises liquefying air with accompanying fractionation and rectification having countercurrent flow of air and liquid whereby there is produced a liquid enriched in oxygen, vaporizing said liquid under reduced pressure by trickling in continuous films in a continuously downward direction and countercurrently in indirect heat exchange relation with the air, conducting and maintaining the liquid enriched in oxygen away from the heat exchange surface during liquefaction, and alternately conducting the trickling liquid away from with accompanying rectification and then back to the heat exchange surface to effect vaporization thereof and with cocurrent flow in thin streams with continuity of direct contact of vapor and liquid.

6. A process for the resolution of air into oxygen and nitrogen which comprises liquefying air with accompanying fractionation and rectification having countercurrent flow of air and liquid whereby there is produced a liquid enriched in oxygen, vaporizing said liquid under a pressure of about .5 atmospheres absolute by trickling in continuous films in a continuously downward direction and countercurrently in indirect heat exchange relation with the air, conducting and maintaining the liquid enriched in oxygen away from the heat exchange surface during liquefaction, and alternately conducting the trickling liquid away from with accompanying rectification and then back to the heat exchange surface to effect vaporization thereof, and with cocurrent flow in a continuous substantially uniform manner in thin streams with continuity of direct contact of vapor and liquid.

7. A process for the resolution of a gaseous mixture which comprises liquefying said gaseous mixture with countercurrent flow of gas and liquid produced, vaporizing said produced liquid by trickling in continuous films in a continuously downward direction and countercurrently in indirect heat exchange relation with the gaseous mixture, conducting and maintaining the liquid formed by liquefaction away from the heat exchange surface during the liquefaction, and alternately conducting the trickling liquid away from with accompanying liquefaction and then back to the heat exchange surface and with co-current flow with continuity of direct contact of vapor and liquid.

8. An apparatus for condensation of a gaseous mixture and for vaporization of a difficultly boiling component in a process for the resolution of gaseous mixtures which comprises in combination an outer casing provided with an inlet connection for introducing a cooled gaseous mixture to be resolved, and an outlet connection for withdrawal of a separated component, headers positioned near the bottom and near the top of said casing, means consisting of a plurality of vaporizing chambers extending between said headers, condensation spaces surrounding said vaporizing chambers, rectification insets positioned within the vaporizing chambers and within the condensation spaces, and a conduit leading from the lower part of said outer casing to the upper header whereby liquid condensed in the condensation spaces and collected in the lower part of the outer casing is conveyed to the upper header from which it passes to, flows down, and is vaporized upon the surfaces within said vaporizing chambers.

9. An apparatus for condensation of a gaseous mixture and for vaporization of a difficultly boiling component in a process for the resolution of gaseous mixtures which comprises in combination an outer casing provided with an inlet connection for introducing a cooled gaseous mixture to be resolved, and an outlet connection for withdrawal of a separated component, headers positioned near the bottom and near the top of said casing, means consisting of a plurality of vaporizing chambers extending between said headers, condensation spaces surrounding said vaporizing chambers, rectification insets positioned within the vaporizing chambers and within the condensation spaces, and a conduit leading from the lower part of said outer casing to the upper header whereby liquid condensed in the condensation spaces and collected in the lower part of the outer casing is conveyed to the upper header from which it passes to, flows down, and is vaporized upon the surfaces within said vaporizing chambers, and each of said vaporizing chambers being provided with means for effecting a uniform distribution of liquid to be vaporized over the vaporizing surfaces.

10. An apparatus for condensation of a gaseous mixture and for vaporization of a difficultly boiling component in a process for the resolution of gaseous mixtures which comprises in combination an outer casing provided with an inlet connection for introducing a cooled gaseous mixture to be resolved, and an outlet connection for withdrawal of a separated component, headers positioned near the bottom and near the top of said casing, means consisting of a plurality of vaporizing chambers extending between said headers, condensation spaces surrounding said vaporizing chambers, rectification insets positioned within the vaporizing chambers and within the condensation spaces, and a conduit leading from the lower part of said outer casing to the upper header whereby liquid condensed in the condensation spaces and collected in the lower part of the outer casing is conveyed to the upper header from which it passes to, flows down, and is vaporized upon the surfaces within said vaporizing chambers, and means for effecting a damming up of liquid to be vaporized to such a height that uniform distribution upon the vaporizing surfaces is occasioned.

11. An apparatus for condensation of a gaseous mixture and for vaporization of a difficultly boiling component in a process for the resolution of gaseous mixtures which comprises in combination an outer casing provided with an inlet connection for introducing a cooled gaseous mixture to be resolved, and an outlet connection for withdrawal of a separated component, headers positioned near the bottom and near the top of said casing, means consisting of a plurality of vaporizing chambers extending between said headers, condensation spaces surrounding said vaporizing chambers, rectification insets positioned within the vaporizing chambers and within the condensation spaces, and a conduit leading from the lower part of said outer casing to the upper header whereby liquid condensed in the condensation spaces and collected in the lower part of the outer casing is conveyed to the upper header from which it passes to, flows down, and is vaporized upon the surfaces within said vaporizing chambers, and a wire gauze insert positioned at the top of each of the vaporizing chambers whereby a damming up and uniform distribution of liquid upon the vaporizing surfaces is effected.

12. An apparatus as described in claim 8 in which the rectification insets comprise in combination a plurality of corrugated metal strips, the corrugations being diagonally disposed.

13. An apparatus as described in claim 8 in which the rectification insets comprise in combination a plurality of pairs of perforated and corrugated metal strips, said corrugations being diagonally disposed and the strips in each pair being so arranged that the corrugations are crosswise.

14. An apparatus as described in claim 8 in which the rectification insets comprise in combination a plurality of pairs of perforated and corrugated metal strips, said corrugations being diagonally disposed and the strips in each pair being so arranged that the corrugations are crosswise, and each immediately succeeding pair of strips being disposed in a manner such that the corrugations are positioned in direction opposite to those in the preceding pair.

15. An apparatus as described in claim 8 in which the rectification insets comprise in combination a plurality of pairs of perforated and corrugated metal strips, said corrugations being diagonally disposed and the strips in each pair being so arranged that the corrugations are crosswise and each pair of strips being separated by a plain metallic strip provided with a plurality of lugs.

MATHIAS FRÄNKL.